Dec. 23, 1969 V. D. ARP 3,486,079
SUPERCONDUCTOR SWITCH
Filed Oct. 24, 1967

Vincent D. Arp,
INVENTOR.
BY Harry M. Saragovitz
Edward J. Kelly
Herbert Berl
Aubrey J. Dunn

United States Patent Office 3,486,079
Patented Dec. 23, 1969

3,486,079

SUPERCONDUCTOR SWITCH

Vincent D. Arp, Boulder, Colo., assignor to the United States of America as represented by the Secretary of the Army Filed Oct. 24, 1967, Ser. No. 677,806
Int. Cl. H01h *47/00;* H01f *7/22*
U.S. Cl. 317—123 1 Claim

ABSTRACT OF THE DISCLOSURE

A system for rapidly switching high currents. A superconductive material in a cryogenic environment is connected in parallel with a load. When the material is subjected to a critical magnetic field, it loses its superconductivity, and diverts the current to the load.

BACKGROUND OF THE INVENTION

This invention is in the field of high current switches.

High currents may be switched into loads in at least two ways, depending on the energy source providing the current. A large capacitor may be charged, and suddenly discharged to yield a high current into a load. Or, a current may be established in a large inductor, with the inductor being suddenly connected to the load, to provide a large current. Of these two schemes, the inductive storage scheme offers at least one advantage. Above about $10^6$ joules, an inductor is able to store a much large amount of energy than a capacitor, for a given volume. An inductive storage system has the disadvantage of requiring the interruption of high currents (in a particular application, currents as high as 200,000 amperes). The interruption of large currents brings the known problems of high current switching, such as establishment of arcs across relatively movable switch contacts (and the attendant dissipation of power in the switch), and slow break times (because of the arc). High power tubes may be used, but have relatively high internal impedances. The invention overcomes these disadvantages.

SUMMARY OF THE INVENTION

The invention is a switch system employing a special switch connected in parallel with a load. The switch includes a superconductive material maintained at a cryogenic temperature. When the material is exposed to a critical magnetic field, it reverts to its normal state, or becomes conductive (begins to have some resistance, as opposed to zero resistance in the superconductive state). A power source including an inductive storage element provides a high current through the material in its superconductive state. When the material becomes conductive (non-superconductive), the current is diverted to the load. The load has a lower resistance than the material, when the material loses its superconductivity.

This inventive system overcomes the disadvantages of switches using movable contacts, since no arc is established. Other types of switches, or current interrupters, such as ignitrons, to do not provide the low resistance path that can be provided by a superconductor. With no arc, little power is dissipated in the inventive system, and high switching speeds may be realized. The invention acts as a shunt across the load until the critical magnetic field is applied, at which time the inventive switch acts as a resistance path higher than the load, and the load assumes the majority of the current.

An object of this invention is to provide a novel current-switching circuit.

Another object is to provide a cryogenic switch circuit.

Yet another object is to provide a superconductive switch system.

A further object is to provide a high-current, high-energy storage system.

These objects, and others which may be obvious to one skilled in the art, may be realized by the invention as described hereinafter, with the accompanying drawings.

DESCRIPTION OF THE PREFERRED EMBODIMENT

Figure 1:
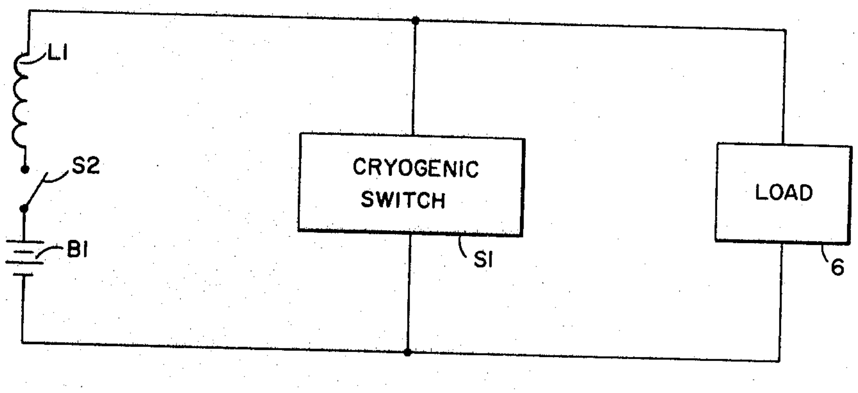
FIGURE 1 of the drawings shows a schematic diagram of the system of the invention, and, FIGURE 2 is a schematic showing of the cryogenic switch of the inventive system.

Referring to FIGURE 1 of the drawings, S1 designates a cryogenic switch in series with battery B1, switch S2, and storage inductance L1. A load 6 is connected in parallel with switch S1.

Figure 2:
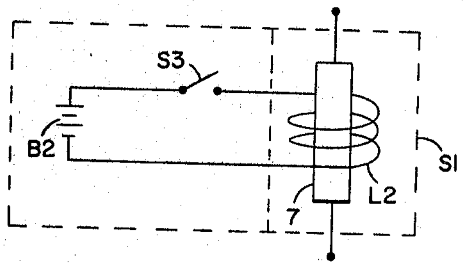

Cryogenic switch S1 is shown in greater detail in FIGURE 2, and is seen to consist of a bar 7 of superconductive material surrounded by coil L2. Coil L2 is connected in series with battery B2 and switch S3. Bar 7 and coil L2 are maintained at a cryogenic temperature by being immersed in liquid helium or hydrogen. When switch S3 is closed, current from battery B2 flows through coil L2 and a critical magnetic field is induced in bar 7. The critical field makes bar 7 lose its superconductivity (return to its normal state). In its normal state, bar 7 has greater resistance than the load.

Referring again to FIGURE 1, cryogenic switch S1, in its superconductive state, effectively shunts the current from battery B1, which current also passes through switch S2 and storage inductor L1. When S1 is operated by closing S3 (FIGURE 2), the load then has a resistance less than S1, and the circuit current is diverted into the load. It can be seen that switch S1 acts as a removable shunt across the load, or a variable resistance in parallel therewith. In order for proper operation, the resistance of switch S1 (in its normal, or non-superconducting state) should be at least 10 times the resistance of the load. With these relative resistances, the majority of the circuit current will flow through the load when S1 is operated.

While a specific embodiment of the invention has been shown and described, other embodiments may be obvious to one skilled in the art, in light of this disclosure. For example, batteries B1 and B2 may be replaced by rectified and filtered A–C power, if desired. Switch S3 may be relay operated, or could be replaced by a transistor, tube, or some other controlled electron discharge device. Battery B2 may well be replaced by an A–C source, with no rectification. Coil L2 may be located external of the cryogenic environment of bar 7, if desired. Various types of loads may be energized by the present invention, such as a high energy laser pump, etc. Inductance L1 may be maintained in a cryogenic environment, if desired for space considerations.

I claim:

1. A circuit for discharging an inductive storage element into a load, including means for charging said storage element and means for discharging said storage element each connected in series with said storage element and each other, said load being connected in parallel with said means for discharging, said means for discharging including a superconductor in a cryogenic environment and means for subjecting said superconductor to a critical magnetic field.

References Cited

UNITED STATES PATENTS

| | | | |
|---|---|---|---|
| 2,913,881 | 11/1959 | Garwin | 335—216 XR |
| 3,150,291 | 9/1964 | Laquer | 335—216 XR |
| 3,278,808 | 10/1966 | Bonfeld | 335—216 XR |
| 3,359,394 | 12/1967 | Mains | 335—216 XR |

GEORGE HARRIS, Primary Examiner

U.S. Cl. X.R.

335—216